(12) United States Patent
Berger

(10) Patent No.: US 9,701,208 B2
(45) Date of Patent: Jul. 11, 2017

(54) INVERTER

(75) Inventor: Hubert Berger, St. Lorenzen im Muerztal (AT)

(73) Assignee: FH Joanneum GmbH, Kapfenberg (AT)

( * ) Notice: Subject to any disclaimer, the term of this patent is extended or adjusted under 35 U.S.C. 154(b) by 763 days.

(21) Appl. No.: 14/123,190

(22) PCT Filed: Jun. 1, 2012

(86) PCT No.: PCT/EP2012/060453
§ 371 (c)(1),
(2), (4) Date: Feb. 24, 2014

(87) PCT Pub. No.: WO2012/164099
PCT Pub. Date: Dec. 6, 2012

(65) Prior Publication Data
US 2014/0159481 A1    Jun. 12, 2014

(30) Foreign Application Priority Data
Jun. 1, 2011   (EP) ..................... 11168555

(51) Int. Cl.
*B60L 11/18* (2006.01)
*H02M 7/493* (2007.01)
(Continued)

(52) U.S. Cl.
CPC ......... *B60L 11/1803* (2013.01); *H02M 7/493* (2013.01); *H02M 7/5387* (2013.01);
(Continued)

(58) Field of Classification Search
CPC .................................................. B60L 11/1803
See application file for complete search history.

(56) References Cited

U.S. PATENT DOCUMENTS 5,341,075 A      8/1994  Cocconi
5,576,943 A  *  11/1996  Keir ...................... H02M 7/493
                                                          363/132
(Continued)

FOREIGN PATENT DOCUMENTS

EP     1 513 247 A1    3/2005
EP        2107672 A1   10/2009
(Continued)

OTHER PUBLICATIONS

EPO Office Action, Communication Pursuant to Article 94(3) EPC, Mar. 3, 2016, 5 pp.

*Primary Examiner* — Jeffrey Shin
(74) *Attorney, Agent, or Firm* — Robert A. Blaha; Smith Tempel Blaha LLC

(57) ABSTRACT

An electronic circuit comprising a direct current interface at which a direct current is providable, an alternating current interface at which an alternating current is providable, a set of switchable half-bridges coupled to the direct current interface, each half-bridge comprising two blocks each having a switch and a diode, a control entity configured for switching the switches of the half-bridges with a predefined relative phase shift between different half-bridges, and a filter entity arranged between the alternating current interface and a plurality of parallel paths relating to the plurality of half-bridges wherein the filter entity comprises a coupled inductor inductively coupling the plurality of parallel paths.

19 Claims, 7 Drawing Sheets

(51) Int. Cl.
*H02M 7/5387* (2007.01)
*H02M 1/00* (2006.01)

(52) U.S. Cl.
CPC ........ *B60L 11/1842* (2013.01); *B60L 2210/40* (2013.01); *H02M 2001/0048* (2013.01); *Y02E 60/721* (2013.01); *Y02T 10/7005* (2013.01); *Y02T 10/7072* (2013.01); *Y02T 10/7241* (2013.01); *Y02T 10/92* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y04S 10/126* (2013.01)

(56) References Cited

U.S. PATENT DOCUMENTS

| | | | |
|---|---|---|---|
| 6,449,181 B1 | 9/2002 | Rieger et al. | |
| 8,842,450 B2 * | 9/2014 | Jungreis | H02M 3/285 363/21.03 |
| 2008/0179951 A1 * | 7/2008 | Brune | H02M 5/4585 307/31 |

FOREIGN PATENT DOCUMENTS

| | | | |
|---|---|---|---|
| GB | 2377097 A | 12/2002 | |
| WO | 2007103651 A2 | 9/2007 | |
| WO | 2008117166 A2 | 10/2008 | |

* cited by examiner

INVERTER

TECHNICAL FIELD

The invention relates to an electronic circuit.

Furthermore, the invention relates to an arrangement comprising multiple electronic circuits.

Moreover, the invention relates to a drive system for an electric vehicle.

Beyond this, the invention relates to a frequency converter.

Furthermore, the invention relates to a method of generating an output alternating current from a supplied direct current.

The invention also relates to a coupled inductor.

Beyond this, the invention relates to a program element.

The invention further relates to a computer-readable medium

BACKGROUND

Pulse width modulated three-phase or multi-phase inverters are used for speed-variable motor applications, as utility interfaces (for example for feeding-in renewable energy) as well as for various other applications.

A three-phase inverter is a device that transforms electrical energy from direct voltage/current to a three-phase alternating current system. Such a device can be unidirectional or bidirectional in terms of the energy transport.

EP 2,107,672 A1 discloses a transformerless three-phase inverter which includes a three-phase bridge circuit and at least one divided intermediate circuit. The neutral conductor of a three-phase AC low-voltage mains is separated from the central point of the intermediate circuit. The inverter is connected to the AC low-voltage mains via a three-conductor mains input.

U.S. Pat. No. 5,341,075 discloses a combined battery recharge and motor drive system which employs an essentially conventional polyphase pulse width modulated (PWM) inverter and a polyphase motor which may be reconnected to operate in a battery recharge mode. Single phase or three-phase AC power from an external source is applied across the reconfigured circuit, and the inverter switches are then controlled to operate as a boost switching regulator. Electrostatic (Faraday) shielding techniques and construction allow extremely small ground currents for improved safety an GFI outlet compatibility.

However, conventional inverters are in many cases complex in construction.

SUMMARY

There may be a need for a compact inverter for inverting a direct current into an alternating current, or vice versa.

The present application presents exemplary embodiments of an electronic circuit, a drive system for an electric vehicle, a frequency converter, a method of generating an output alternating current from a supplied direct current, a coupled inductor, a program element, and a computer-readable medium according to the independent claims are provided.

According to an exemplary embodiment of the invention, an electronic circuit is provided which comprises a direct current interface at which a direct current is providable (for instance an input current is supplied or an output current is supplied to this interface), an alternating current interface at which an alternating current is providable (for instance an output current is supplied or an input current is supplied to this interface), a set of switchable half-bridges coupled to the direct current interface, each half-bridge comprising two blocks each having a switch and a diode, a control entity (such as a microprocessor or a CPU) configured for switching the switches of the half-bridges with a predefined relative phase shift (different from zero) between different half-bridges (and optionally so that, at any time, one of the switches of each half-bridge is "on" (i.e. is activated to provide an electric coupling) and the other one of the switches of each half-bridge is "off" (i.e. is deactivated to disable an electric coupling)), and a filter entity arranged between the alternating current interface and a plurality of parallel paths relating to the plurality of half-bridges, wherein the filter entity comprises a coupled inductor inductively coupling the plurality of parallel paths (to one another).

According to another exemplary embodiment of the invention, an arrangement of three sets of electronic circuits having the above mentioned features is provided, wherein ripple currents in an input capacitance between the direct current interface and the set of switchable half-bridges as well as in an output capacitance of the filter entity are reduced by superimposing a third harmonic waveform signal to a sinusoidal reference signal in a PWM generator of the control unit resulting in a period of constant duty cycle of the pulse width modulation, allowing to adjust a direct current link voltage and thus the duty-cycle in a way, that at least partially cancels phase-shifted harmonics. According to an embodiment, a three-phase alternating current converter may however also be operated without the feature of a superposition of a third harmonics.

According to another exemplary embodiment of the invention, a drive system for an electric or a hybrid vehicle is provided, wherein the drive system comprises a battery configured for providing a direct current, and an electronic circuit having the above mentioned features, wherein the direct current interface is coupled to the battery.

According to yet another exemplary embodiment of the invention, a frequency converter is provided which comprises a first electronic circuit having the above mentioned features and operating at a first frequency, and a second electronic circuit having the above mentioned features and operating at a second frequency, wherein the direct current interface of the first electronic circuit is coupled (particularly directly) to the direct current interface of the second electronic circuit, wherein an alternating current is supplyable or supplied to the alternating current interface of the first electronic circuit at the first frequency, and wherein an alternating current is generated at the alternating current interface of the second electronic circuit at the second frequency.

According to another exemplary embodiment of the invention, a coupled inductor is provided which comprises a plurality of magnetic structures being arranged spaced relative to one another, a plurality of coils each of which being wound over an assigned one of the plurality of magnetic structures, a first magnetic coupling structure connected to each of the plurality of magnetic structures, and a second magnetic coupling structure being spaced from each of the plurality of magnetic structures via a gap.

According to still another exemplary embodiment of the invention, a method of generating an output alternating current from a supplied direct current is provided, wherein the method comprises supplying the direct current to a set of switchable half-bridges, each half-bridge comprising two blocks each having a switch and a diode, switching the switches of the half-bridges with a predefined relative phase shift between different half-bridges (and optionally so that, at any time, one of the switches of each half-bridge is on and the other one of the switches of each half-bridge is off) for dividing the direct current into a plurality of parallel paths relating to the plurality of half-bridges, extracting a fundamental mode from each of the plurality of parallel paths in a filter entity, and superposing the extracted fundamental modes in the filter entity to thereby generate the output alternating current, wherein the filter entity comprises a coupled inductor inductively coupling the plurality of parallel paths.

According to still another exemplary embodiment of the invention, a program element (for instance a software routine, in source code or in executable code) is provided, which, when being executed by a processor (such as a microprocessor or a CPU), is adapted to control or carry out a method having the above mentioned features.

According to yet another exemplary embodiment of the invention, a computer-readable medium (for instance a CD, a DVD, a USB stick, a floppy disk or a harddisk) is provided, in which a computer program is stored which, when being executed by a processor (such as a microprocessor or a CPU), is adapted to control or carry out a method having the above mentioned features.

Current or voltage inversion which may be performed according to embodiments of the invention can be realized by a computer program, that is by software, or by using one or more special electronic optimization circuits, that is in hardware, or in hybrid form, that is by means of software components and hardware components.

In the context of this application, the term "direct current" (DC) may particularly denote a steady flow of electricity in one direction, i.e. being the opposite of alternating current (AC). DC may relate to electric current without alterations. The skilled person will understand that a direct current will also imply a direct voltage so that both terms can be considered as equivalent.

In the context of this application, the term "alternating current" (AC) may particularly denote an electric current that reverses its direction particularly sinusoidally, i.e. being the opposite of direct current (DC). In AC, the movement or flow of electric charge periodically reverses direction. The skilled person will understand that an alternating current will also imply an alternating voltage so that both terms can be considered as equivalent.

In the context of this application, the term "predefined relative phase shift between different half-bridges" may particularly denote that adjacent half-bridges are switched so that the on-time intervals and the off-time intervals defined by switching signals applied to corresponding switches of the adjacent (i.e. directly neighboured in a circuitry) half-bridges are not the same (i.e. phase angle differs from k*2 π, k being an integer or zero) but have a well-defined and constant phase relation to one another, for instance may differ by π/3. Such a phase relation may be the same between each two adjacent half-bridges of a set.

In the context of this application, the term "extracting a fundamental mode" may particularly denote that the time varying signal generated by each of the correspondingly controlled half-bridges can be manipulated in terms of its various frequency components, i.e. fundamental mode and first, second, third, etc. harmonics thereof. The extraction procedure may pass only the fundamental mode while suppressing at least a part of the harmonics. This may be performed by effecting suppression or even elimination of the modes of higher orders (harmonics) by an interaction between them, i.e. by a destructive interference between them. The coupled inductor may contribute to this mode adjustment.

In the context of this application, the term "superposing the extracted fundamental modes" may particularly denote adding individual current contributions from the paths, each contribution relating to the corresponding fundamental mode. However, not the entire set of modes is added, higher harmonics should be suppressed or even eliminated.

In the context of this application, the term "coupled inductor" may particularly denote path-related inductances which are magnetically or inductively coupled to such an extent to one another that an electromagnetic interaction between the electric signals propagating along the various paths is enabled.

In the context of this application, the term "frequency converter" may particularly denote an electronic member capable of transferring an input alternating signal at a first frequency to an output alternating signal at a second frequency differing from the first frequency.

In the context of this application, the term "electronic circuit operating at a certain frequency" may particularly denote an electronic circuit which is capable of working by supplying an input signal at the mentioned frequency.

In the context of this application, the term "gap" may particularly denote a physical space being free of solid magnetic material, thereby serving as a magnetic decoupling spacer magnetically decoupling to a certain degree two magnetic media. Such a gap may be free of material, may be an air gap, or may be a gap filled with a dielectric material.

According to an exemplary embodiment, an electronic circuitry is provided which allows to convert a direct current (or a direct voltage) into an alternating current (or an alternating voltage), or vice versa, in a highly efficient way. Hence, such a circuitry may operate unidirectional or bidirectional. It is possible to invert the signal propagation direction, i.e. to convert an alternating current into a direct current. Again referring to the DC/AC operation mode, a direct current may be supplied to a plurality of half-bridges. The half-bridges may comprise two identical blocks having switches which can be switched under control of a control unit. By such a switching, the input direct current may be chopped into a plurality of time varying signals. This chopping procedure involves an at least partially inverse driving of the two switches of each half-bridges, so that there is, at least over a part of the duty cycle, one switch closed and the other one open. Furthermore, this chopping involves a phase shift between adjacent half-bridges, so that there is always a delay between switching operations between each two adjacent pairs of half-bridges. By taking this measure, a set of chopped signals, each having multiple frequency components or in other words a fundamental frequency and harmonics, are generated. Advantageously, all these signals are then supplied to a coupled inductor which couples all the paths inductively. This results in an interaction of the modes of all paths in such a manner, that the fundamental mode is passed (or interact constructively) and the harmonics of higher orders are suppressed or eliminated (or interact destructively). Hence, adding the correspondingly filtered signals results in an overlay of the fundamental frequency components so that a sinusoidal output signal is generated. Thanks to the provision of the coupled inductor, a very compact circuitry can be achieved, since particularly the filtering part is rendered highly efficient.

Next, further exemplary embodiments of the electronic circuit will be explained. However, these embodiments also apply to the arrangement, the drive system for an electric vehicle, the frequency converter, the method of generating an output alternating current from a supplied direct current, the coupled inductor, the program element, and the computer-readable medium.

In an embodiment, the control entity is configured so that, at any time, one of the switches of each half-bridge is on and the other one of the switches of the corresponding half-bridge is off. The embodiment in FIG. 2 may be operated correspondingly.

In another embodiment, the control entity is configured so that, intermittently, both switches of each half-bridge are off and, at all other times, one of the switches of each half-bridge is on and the other one of the switches of the corresponding half-bridge is off. The embodiment in FIG. 3 may be operated correspondingly. Thus, it is also possible that over a short part of the duty cycle both transistors are deactivated, whereas over another main part of the duty cycle one of the transistors is activated while the other one is deactivated. However, it needs to be prevented that both switches of a half-bridge are both on because this may result in an undesired short-circuit.

In an embodiment, the electronic circuit comprises a first group of a switch and a diode and a second group of a switch and a diode, wherein the first group is connected between the direct current interface and one of the two blocks of each of the half-bridges, and wherein the second group is connected between the direct current interface and the other one of the two blocks of each of the half-bridges.

In an embodiment, the set of switchable half-bridges, the control unit and the filter entity are all formed on a common printed circuit board. This may be particularly advantageous for automotive applications where a motor or the like may be combined with such a common circuit board resulting in a compact design. All the members may be integrated on a common printed circuit board being controlled by a common FPGA.

In an embodiment, the direct current interface is configured for supplying a direct input current thereto, wherein the set of switchable half-bridges is coupled to the direct current interface for supplying the direct current to the half-bridges. In such an embodiment, the transport of electrical energy may be from the direct current side to the alternating current side.

In an embodiment, the control entity is configured for switching the half-bridges to thereby divide the direct current into the plurality of parallel paths relating to the plurality of half-bridges. This splits an input signal into various partial phase shifted signals to be further processed.

In an embodiment, the alternating current interface is configured for supplying an alternating current. The set of switchable half-bridges may be coupled to the alternating current for supplying the alternating current to the half-bridges. In such an embodiment, an AC input signal may be processed to as to generate a DC output signal In an embodiment, the filter entity is configured for extracting a fundamental mode from each of the plurality of parallel paths and for superposing the extracted fundamental modes to thereby generate an output alternating current to be applied to the alternating current interface. Harmonics may be suppressed for at least partially removing ripples from the signal.

In an embodiment, the electronic circuit comprises at least one further set of switchable half-bridges coupled to the direct current interface, each further half-bridge comprising two blocks each having a switch and a diode, wherein the control entity is configured for controlling the set of switchable half-bridges and the at least one further set of switchable half-bridges so that the set and the at least one further set are operated with a predefined relative phase shift between different sets. Thus, a double phase shift architecture is possible. Firstly, different half-bridges of the same set may be driven with a defined phase shift between each pair of two adjacent half-bridges of the same set. Secondly, corresponding half-bridges of different sets may be driven with another defined phase shift to one another which may be the same for each pair of two corresponding half-bridges of adjacent sets.

In an embodiment, the control entity is configured for controlling the set of switchable half-bridges and the at least one further set of switchable half-bridges to provide at least two phase shifted output alternating current signals at the alternating current interface. Thus, this architecture may be applied for inverting a direct current into an alternating current to be supplied with different phases at various output terminals.

Thus, in a preferred embodiment, the electronic circuit comprises at least one further set of switchable half-bridges coupled to the direct current interface for supplying a direct current to the at least one further plurality of half-bridges, each further half-bridge comprising two blocks each having a switch and a diode, wherein the control entity is configured for controlling the set of switchable half-bridges and the at least one further set of switchable half-bridges so that the set and the at least one further set are operated with a predefined relative phase shift between different sets to thereby provide at least two phase shifted alternating current signals at the alternating current interface. By providing one or more additional sets of interleaved half-bridges, it is possible to provide a two-level, three-level, etc., or more generally a multi level inverter, wherein such a multi level inverter has multiple output nodes having a defined phase correlation and phase shift relative to one another. In such a scenario, a common control unit for all sets can be provided, or alternatively individual control units for each individual set may be provided. In an embodiment, the power switches and power diodes are arranged as a multi-level inverter (particularly as a two- or three-level inverter).

In an embodiment, at least a part of the switches comprises a transistor, particularly one of the group consisting of a bipolar transistor and a field effect transistor. Examples for implementable transistors are a JFET, a MOSFET, and an Insulated Gate Bipolar Transistor. Such transistor switches allow for a very compact construction of the circuitry, In an embodiment, the filter entity further comprises at least one filter capacitor and/or at least one filter resistor configured for frequency filtering, particularly for low pass filtering or band pass filtering, of the output alternating current. Particularly the provision of two filter capacitors coupled in parallel to one another and one filter resistor coupled serially with one of the filter capacitors allows for a very accurate filter performance thereby efficiently suppressing higher frequency components from modes of higher harmonics which are not yet removed completely.

In an embodiment, the electronic circuit comprises at least one smoothing capacitor arranged between the direct current interface and the set of switchable half-bridges and configured for smoothing the supplied direct current. Such one or more smoothing capacitors allow to suppress or eliminate ripples which might be unintentionally part of a non-ideal input direct current signal.

In an embodiment, the electronic circuit comprises at least one damping resistance arranged between the direct current interface and the set of switchable half-bridges and being configured for damping artifacts superposed to the direct current. Without wishing to be bound to a specific theory, it is presently believed that by such one or more damping resistances (particularly on an input side of the electronic circuit), disturbing resonances or other signal artifacts from the environment may be efficiently suppressed or eliminated. It can be seen in practice that the performance of the electronic circuit can be significantly improved by providing the mentioned one or more damping resistances.

In an embodiment, two damping resistances are provided, one of which being directly connected to one terminal (or node) of the direct current interface and the other one being directly connected to the other terminal (or node) of the direct current interface. Two smoothing capacitors are provided and connected in series between the two damping resistances. This architecture has turned out to be particularly powerful in terms of signal quality.

In an embodiment, two smoothing capacitors are provided and connected in series between two terminals of the direct current interface, wherein the electronic circuit further comprises a feedback loop (i.e. an electrically conductive path) connecting the filter entity to a connection or terminal between the two smoothing capacitors. Thus, a signal close to or at an output may be fed back to an input.

In an embodiment, the feedback loop consists of an ohmically conductive path. In other words, the feedback loop then connects the filter entity to the two smoothing capacitors only by an electrically conductive line.

In another embodiment, the feedback loop comprises or consists of a feedback capacitor in an electrically conductive path. In other words, the feedback loop may be as simple as a single capacitor connected between the filter entity and the smoothing capacitors by a direct ohmic connection.

In an embodiment, the electronic circuit comprises a set of capacitive paths each comprising a capacitor, wherein each capacitive path of the set is connected in parallel between a respective pair of adjacent ones of the set of switchable half-bridges. This results in an alternating sequence of half-bridges and capacitive paths. Each capacitive path is sandwiched between two consecutive half-bridges. A good performance has been achieved with this architecture.

Embodiments of the electronic circuit can be configured as AC/DC converter or as DC/AC converter.

In an embodiment, the predefined relative phase shift between different half-bridges is approximately $2\pi/n$, wherein n is the number of half-bridges of the set. In an embodiment, the n parallel legs may thus be operated with a phase shift of $2\pi/n$ to one another. For instance, if six half-bridges are present in one set, each two adjacent half-bridges may have a relative phase shift of $\pi/3$ to one another. This phase shift ensures that also the last and the first half-bridges have a phase shift of $2\pi/n$, so that a very symmetric phase scheme is achieved. This ensures that the quality of a sinusoidal signal at the output is very high.

In an embodiment, the phase shift of $2\pi/n$ can be dynamically adapted to the actual number of operative (or operated) half-bridges for the case that the number of operated half-bridges is reduced in order to improve partial load efficiency or because of failures in individual half-bridges.

In an embodiment, the relative phase shift between different sets is approximately $2\pi/(n\,m)$, wherein m is the number of sets. In a similar manner, this phase shift synchronizes the signal processing among the various sets and ensures a homogeneous distribution of the phase shift over the various sets. Thus, the groups of parallel legs of each of the multiple (for instance three) phases may be operated with a phase shift of $2\pi/(m\,n)$ to one another in order to further reduce ripple currents especially in the DC-link capacitor.

In an embodiment, the coupled inductor of the electronic circuit is configured as described above, wherein one terminal of each coil is coupled to a respective one of the half-bridges and another terminal is coupled to the alternating current interface. Hence, with such an architecture, all half-bridges of a set (and optionally all half-bridges of all sets) are inductively coupled to one another by the coupled inductor so as to reliably filter out undesired harmonics which would disturb a sinusoidal character of the output signal.

The electronic circuit may particularly be configured as a three-phase inverter arrangement. Such a three-phase inverter arrangement may comprise power switches, power diodes, driver circuits, filter circuits and a control unit for generating the pulse-width modulated drive signals being adapted to convert electric energy from DC to three-phase AC, or vice versa. Such a circuit may be characterized by multiple (n) half-bridges (legs) connected in parallel for every of three grid phases or motor phases, respectively.

In an embodiment, the output filter is an integrative part of the converter both for grid-connected applications as well as for motor-drive and power-amplifier applications.

In an embodiment, the inductances of the output filter are compensating an essential part of the common-mode magnetomotive force by being mutually magnetically coupled.

In an embodiment, the mutually magnetically coupled inductances are designed in a way that the common-mode inductance is reduced to about 1/n (n being the number of interleaved parallel legs) of the differential mode inductance, which is preferably accomplished by a magnet circuit arrangement where n symmetrically arranged bobbins with equal magnetic resistances are magnetically coupled having a common back-iron with the same magnetic resistance but realized by an n-times larger core's cross sectional area and an n-times longer air gap providing a common mode inductance of about $(1/n)^{th}$ of the differential mode inductance.

In an embodiment, the back-iron of the mutually magnetically coupled inductances (of each phase) is shared by the three phases or even completely omitted.

In an embodiment, the combination of the interleaved multiple phases with the magnetically coupled inductances allows an extremely small output filter with a resonance frequency close to the switching frequency as well as good damping behaviour with minimal dissipative losses in the damping resistors at the same time.

In an embodiment, the DC link reference voltage will be adjusted in order to control the relation between DC link voltage and the magnitude of the sinusoidal output voltage in a way that the ripple current in the output and input capacitance is minimized.

In an embodiment, the ripple currents in the input capacitance as well as in the output capacitance are further reduced by superimposing a third harmonic waveform signal to the sinusoidal reference signal in a pulse-width modulation generator of the control unit resulting in a long period of constant duty cycle of the pulse width modulation, allowing to adjust the DC link voltage and thus the duty-cycle in a way, that optimally cancels the phase shifted harmonics. For instance, in a grid-side inverter at 400V 3~ this for example can be ~840 V which corresponds to 1.5*562V.

In an embodiment, the ripple currents in the input capacitance as well as in the output capacitance are further reduced by dynamically superimposing a third harmonic waveform signal to the sinusoidal reference signal in the pulse-width modulation generator of the control unit by adapting the amplitude of this third harmonic waveform in accordance with the actual relation between DC link voltage and the magnitude of the sinusoidal output voltage.

In an embodiment, the currents in the phase shifted interleaved paths are measured in order to adapt the duty cycle in such a way that the currents will be kept balanced.

In an embodiment, the three-phase inverter arrangement may be applied as a high dynamic utility interface for any three-phase AC to DC conversion either with unidirectional or bidirectional power flow, by only adding a standard three-phase line choke of small inductance value (for example $v_{sc}$=2% . . . 4%) or a transformer (preferably with a small short circuit voltage of about 4%) providing an isolated DC supply, which in combination with a (no-isolated) DC-DC converter connected in series can for example serve as a very dynamic battery or ultra-cap simulator.

In an embodiment, the three-phase inverter arrangement may be applied as a DC to AC inverter with sinusoidal output voltages for motor drive applications with unidirectional or bidirectional power flow.

In an embodiment, the three-phase inverter arrangement may be applied as a multipurpose charge & drive inverter in electric or plug-in hybrid vehicles acting as a DC/3~AC inverter for motor supply and optionally as a 3-phase charging unit with unidirectional or bidirectional power flow (vehicle to grid operation).

In an embodiment, the three-phase inverter arrangement may be applicable additionally as a single phase charging unit with unidirectional or bidirectional power flow operated as a single-phase full-bridge converter.

In an embodiment, a three-phase inverter arrangement is provided comprising or consisting of two inverters coupled in series ("back to back") preferably applied as a high dynamic three-phase voltage generator with bidirectional power flow (for example as an artificial mains network or as a simulator for electric motors).

In an embodiment, the three-phase inverter arrangement may be applicable additionally as a high-dynamic DC/single-phase AC voltage generator/signal amplifier.

In an embodiment, a three-phase inverter arrangement may be provided comprising or consisting of two inverters as mentioned above and coupled in series ("back to back") and a three-phase AC motor operated as a 4 quadrant drive for example in dynamic test-bed applications for combustion engines or electrical drives.

In an embodiment, the electronic circuit is configured as a battery simulator (compare FIG. 8A, FIG. 8B). In other words, the electronic circuit may behave similar like a battery.

In an embodiment, the electronic circuit may be configured as an active harmonic mains filter (for instance in a configuration according FIG. 8A or FIG. 8B).

In an embodiment, the electronic circuit comprises a transformer connected between a source providing an alternating current and the alternating current interface.

In an embodiment, the electronic circuit is configured as at least one of the group consisting of a signal-generator, a grid simulator or a simulator for electric motors. The inverter may provide one or multiple alternating current phases. Each phase in terms is built up of a plurality of parallel current paths relating to the plurality of half-bridges, which are pulsed phase-shifted.

Next, further exemplary embodiments of the drive system will be explained. However, these embodiments also apply to the electronic circuit, the arrangement, the frequency converter, the method of generating an output alternating current from a supplied direct current, the coupled inductor, the program element, and the computer-readable medium.

In an embodiment, the drive system comprises an electric motor (for instance forming part of a hybrid motor system) being drivable by electric power from the battery, wherein the alternating current supply interface of the electronic circuit is coupled or couplable to the motor. Thus, a direct current source such as a battery can be used in conjunction with the DC/AC converter according to an exemplary embodiment of the invention to drive an electromotor requiring an alternating current drive signal.

In an embodiment, the drive system comprises a charging entity configured for charging the battery (which may be a rechargeable battery), wherein the alternating current interface of the electronic circuit is coupled or couplable to the charging entity. Such an embodiment, which can particularly be combined with the previously described embodiment, may allow to charge the battery with a direct current signal which can be generated by the inverter according to an exemplary embodiment by conversion from an alternating current signal providing the electric power for charging the battery.

In an embodiment, the charging entity is configured for selectively charging the battery with one of at least two different numbers of phases. For instance, it is possible that the charging entity comprises a first unit providing the alternating current signal with a first number of phases (for instance 2) and has a second unit providing another number of phases (for instance 3).

In an embodiment, the electronic circuit is configured for charging the battery, wherein the alternating current interface of the electronic circuit is coupled or couplable to one or more phases of the grid via a mains-choke.

In an embodiment, the electronic circuit is configured for charging the battery, wherein the alternating current interface of the electronic circuit is coupled or couplable to one or more phases of a grid via stator inductances of a mechanically blocked motor, thus avoiding the need of an additional mains-choke. In case of a three-phase motor with permanent magnets the three-phase current running through the stator windings might produce undesired ripple torques. Provided that the stator consists of at least two pole pairs, the stator inductances are interconnected in a way that the three-phase currents flowing through the inductances do not create a rotating magnetic field in the motor. This will be accomplished by two inversely rotating magnetic fields, which are cancelling their effects on the torque.

Next, further exemplary embodiments of the frequency converter will be explained. However, these embodiments also apply to the electronic circuit, the arrangement, the drive system, the method of generating an output alternating current from a supplied direct current, the coupled inductor, the program element, and the computer-readable medium.

In an embodiment, the frequency converter comprises a transformer connected between a source providing the supplied alternating current and the alternating current interface of the first electronic circuit. A transformer may be denoted as an electronic member that transfers electrical energy from one circuit to another circuit by inductively coupled conductors, the transformers coils.

In an embodiment, the frequency converter comprises an inductance connected between a destination to be supplied with the alternating current and the alternating current interface of the second electronic circuit.

In an embodiment, the frequency converter is configured as an electro motor simulator. The term "electro motor simulator" may particularly denote that the described circuit simulates the performance of an electro motor, however without rotating members and other components of an actual electro motor. Therefore, it is possible to use the circuit for driving another component with a drive behaviour which equals the drive behaviour of an electromotor.

In an embodiment, the frequency converter is configured as at least one of the group consisting of a single signal-generator, a multiphase signal-generator, a grid simulator, and an active mains-filter. However, other applications are possible as well.

Next, further exemplary embodiments of the coupled inductor will be explained. However, these embodiments also apply to the electronic circuit, the arrangement, the drive system, the method of generating an output alternating current from a supplied direct current, the frequency converter, the program element, and the computer-readable medium.

In an embodiment, the plurality of magnetic structures are arranged in a two-dimensional array, particularly in a matrix-like array. For example, the magnetic structures may be cylinders made of a permanent magnetic material such as ferromagnetic or ferrimagnetic material. For instance, the magnetic structures may be arranged in rows and columns.

In an embodiment, the first magnetic coupling structure is a magnetic plate from which the plurality of magnetic structures protrude perpendicularly. Such a magnetic plate may contact end faces of the magnetic coupling structure such as cylinders to provide for a direct inductive coupling. It is possible that the magnetic plate and the plurality of magnetic structures are integrally formed.

In an embodiment, the second magnetic coupling structure is a magnetic plate opposing the plurality of magnetic structures via the gaps. By such gaps, an intentional inductive resistance may be added allowing to properly adjust the inductive coupling properties of the common inductor. Hence, end phases of the magnetic structures may be spaced with regard to the second magnetic plate.

In an embodiment, the coupled inductor comprises a third magnetic coupling structure, particularly a magnetic plate, being spaced from the second magnetic coupling structure via a gap. By taking this measure, one further degree of freedom for adjusting the magnetic impedance of the coupled inductor is provided, thereby refining the filtering performance which increases the accuracy of the sinusoidal output signal.

Next, further exemplary embodiments of the arrangement will be explained. However, these embodiments also apply to the electronic circuit, the coupled inductor, the drive system, the method of generating an output alternating current from a supplied direct current, the frequency converter, the program element, and the computer-readable medium.

In an embodiment, an arrangement of three sets of electronic circuits having the above mentioned features is provided, wherein the ripple currents in the input capacitance as well as in the output capacitance are further reduced by superimposing a third harmonic waveform signal to the sinusoidal reference signal in the PWM generator of the control unit resulting in a long period of constant duty cycle of the pulse-width modulation, allowing to adjust the dc-link voltage and thus the duty-cycle in a way, that optimally cancels the phase-shifted harmonics. For instance in a grid-side inverter at 400V 3~ this e.g. could be ~840V which corresponds to 1.5*562V.

In an embodiment, the ripple currents in the input capacitance as well as in the output capacitance are reduced by dynamically superimposing the third harmonic waveform signal to the sinusoidal reference signal in the pulse width modulator generator of the control unit by adapting the amplitude of this third harmonic waveform in accordance with the actual relation between direct current link voltage and the magnitude of a sinusoidal output voltage.

In an embodiment, inherently created common-mode signals between the direct current interface and the alternating current interface are suppressed by connecting a common star point of the filter entity of multiple sets of switchable half-bridges with a voltage mid-point of the direct current interface creating a low-pass common-mode filter for suppressing harmonics in an electromagnetic interference range but letting pass a potential shift of the third harmonic.

In an embodiment, the inverter provides one or multiple alternating current phases. Each phase in terms is built up of a plurality of parallel current paths relating to the plurality of half-bridges, which are pulsed phase-shifted to one another.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

DETAILED DESCRIPTION OF ILLUSTRATED EMBODIMENTS

Figure 1:
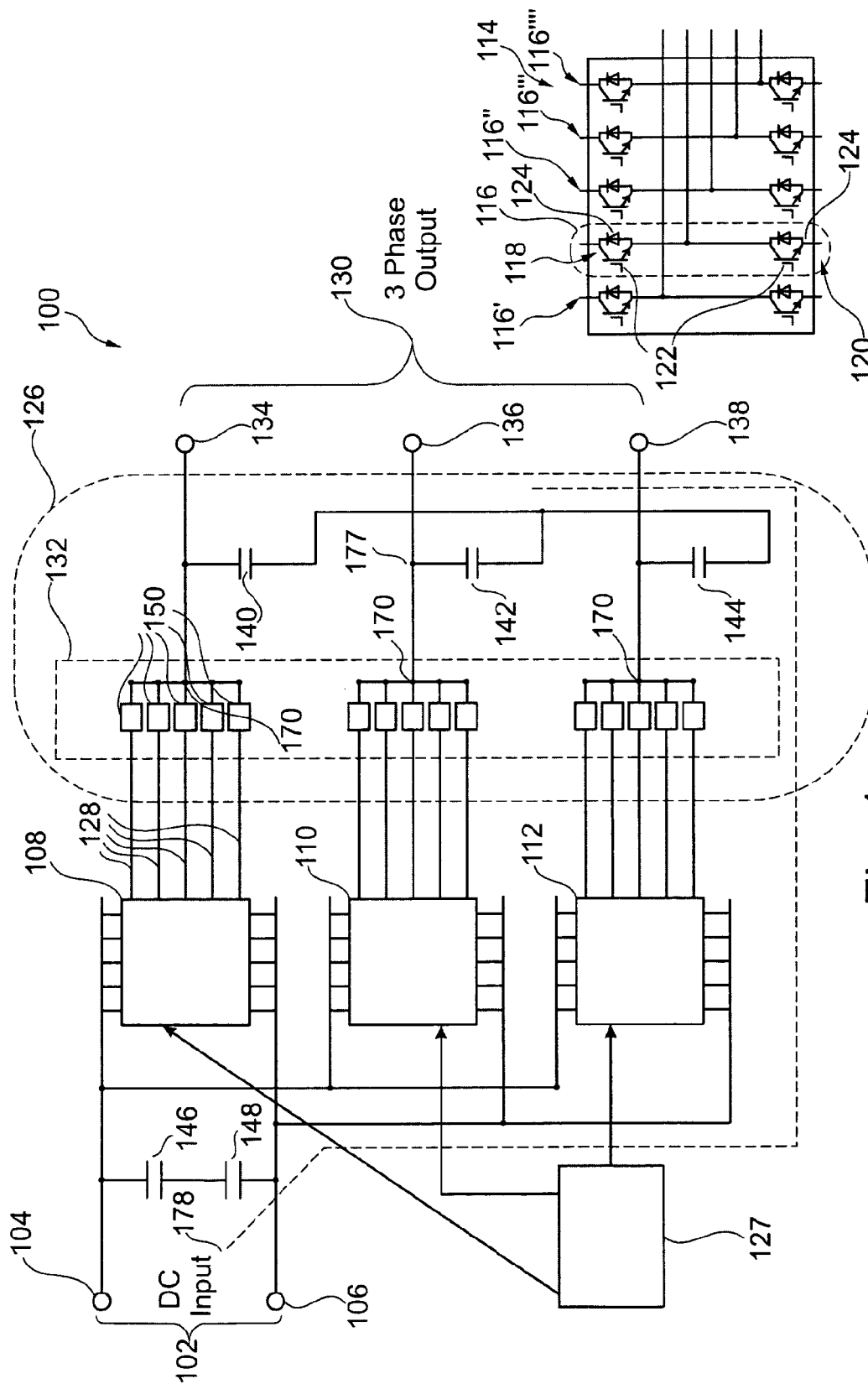
FIG. 1 illustrates an electronic circuit according to an exemplary embodiment of the invention.

The illustration in the drawing is schematically. In different drawings, similar or identical elements are provided with the same reference signs.

In an embodiment, a multipurpose (for instance three-phase) inverter with sinusoidal output voltage is provided. Particularly, a pulse-width-modulated (for instance three-phase) converter/inverter topology is provided in which each of one or more phases consists of multiple interleaved parallel half-bridges resulting in a substantially reduced size of filter elements (inductors and capacitors) allowing the design of an ultra-compact and high-efficient DC/AC inverter with integrated harmonics and EMI-filter components providing pure sinusoidal AC voltages.

FIG. 1 illustrates an electronic inverter circuit 100 according to an exemplary embodiment of the invention.

The electronic inverter circuit 100 comprises a direct current supply interface 102 for providing a direct current input voltage between a first node 104 and a second node 106. The electronic inverter circuit 100 comprises a first half-bridge array 108, a second half-bridge array 110 and a third half-bridge array 112 each of which being constituted as shown in an enlarged view 114. Each half-bridge array or set of half-bridges comprises five half-bridges 116. Each half-bridge 116 has a first block 118 and a second block 120 which are coupled serially. Each block 118, 120 comprises a switch 122 and a diode 124. The switches 122 can be configured as bipolar transistors or as field effect transistors.

Smoothing capacitors 146, 148 are arranged between the direct current supply interface 102 and the sets of switchable half-bridges, i.e. the half-bridge arrays 108, 110 and 112. The smoothing capacitors 146, 148 smooth the supplied direct current, i.e. remove ripples thereof.

A control unit 127 (such as a microprocessor or a central processing unit) is provided which is configured for switching the switches 122 of the half-bridges 116 with a predefined relative phase shift between different half-bridges 116 and so that, at any time, one of the switches 122 is turned on and the other one of the switches 122 of each half-bridge 116 is turned off. For example, a phase shift between the first and the second half-bridge in the detailed view 114 is 72°, so that at a certain time a phase of the first half-bridge 116' is 0°, a phase of the second half-bridge 116 is 72°, a phase of the third half-bridge 116" is 144°, a phase of the fourth half-bridge 116''' is 216° and a phase of the fifth half-bridge 116'''' is 288°. By taking this measure, the direct current provided at the direct current supply interface 102 is divided into a plurality of parallel paths 128 relating to the plurality of half-bridges 116, as shown in the detailed view 114.

Downstream (in a flow of the electricity propagating from the DC input 102 towards the AC output 130) of the half-bridge arrays 108, 110 and 112, a filter entity 126 is arranged which is configured for extracting a fundamental mode from each of the plurality of parallel paths 128 and for superposing the extracted fundamental modes to thereby generate an output alternating current which is provided at an output alternating current supply interface 130. In other words, each signal on each path 128 comprises a fundamental mode at a first frequency and harmonics at higher frequencies which are however at least partially averaged out or filtered out by the filter entity 126. For this purpose, the filter entity 126 comprises a coupled inductor 132 which inductively couples the plurality of parallel paths 128 and provides for an interaction between the various signals propagating along the paths 128. Individual magnetic elements of the coupled inductor 132 are shown schematically as blocks denoted with reference numeral 150. At a connection point 170, all current contributions at the respective outputs of the coupled inductor 132 are added.

Furthermore, as can be taken from FIG. 1, filter capacitors 140, 142 and 144 form part of the filter entity 126 for improving the suppression of the harmonics.

Also between the half-bridge arrays 108, 110 and 112, the control signals or drive signals from the control unit 127 have a corresponding phase shift, so that an alternating current is provided at three output nodes 134, 136, 138 with a phase shift in between.

Inherently created common-mode signals between the direct current interface 102 and the alternating current interface 130 may be suppressed by optionally connecting a common star point 177 of the filter entity 126 of multiple sets of switchable half-bridges with a voltage mid-point 178 of the direct current interface 102 creating a low-pass common-mode filter for suppressing harmonics in an electromagnetic interference range.

Figure 2:
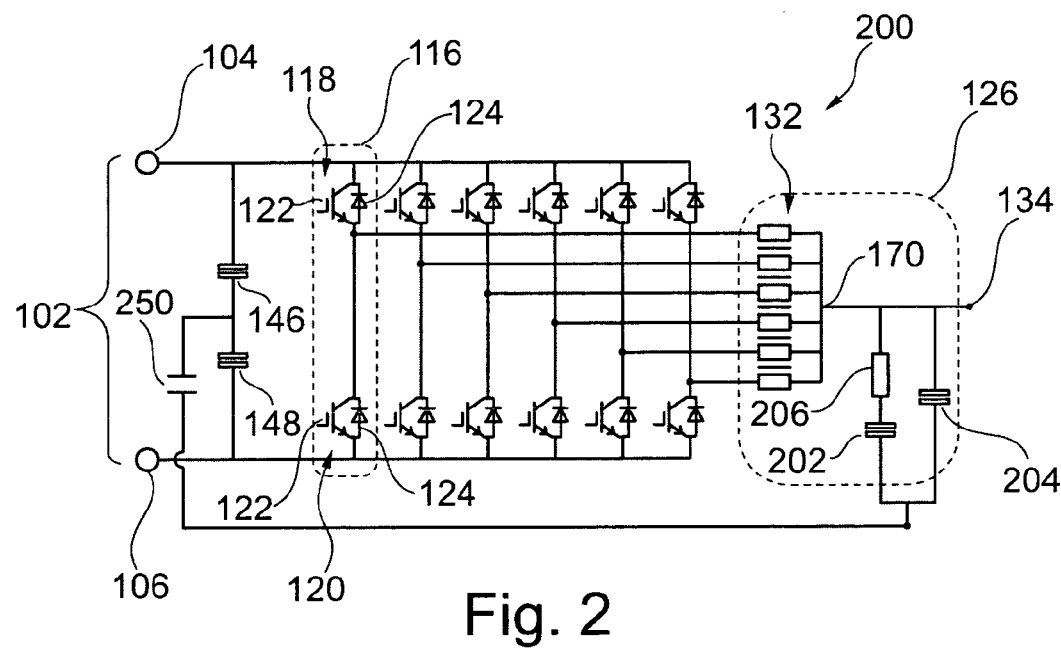
FIG. 2 illustrates a two-level inverter with six-fold interleaved parallel branches for each phase including a DC link capacitor and an output-filter (only one phase is shown) according to an exemplary embodiment of the invention.

While FIG. 1 shows a three-phase inverter, FIG. 2 shows a one-phase inverter 200 according to another exemplary embodiment of the invention.

In the filter entity 126, two filter capacitors 202, 204 are interconnected with a filter resistor 206. Six half-bridges 116 are provided in the arrangement of FIG. 2.

Optionally, a further smoothing capacitor 250 may be arranged in a bypass path connecting a common connection of smoothing capacitors 146, 148 with a common connection of filter capacitors 202, 204. The two smoothing capacitors 146, 148 are provided and connected in series between the two nodes 104, 106 of the direct current interface 102. A bypass or feedback loop connects the filter entity 126 to a connection between the two smoothing capacitors 146, 148.

However, smoothing capacitor 250 may also be omitted. In this case, the bypass path connects smoothing capacitors 146, 148 by a direct ohmic connection to filter capacitors 202, 204.

Figure 3:
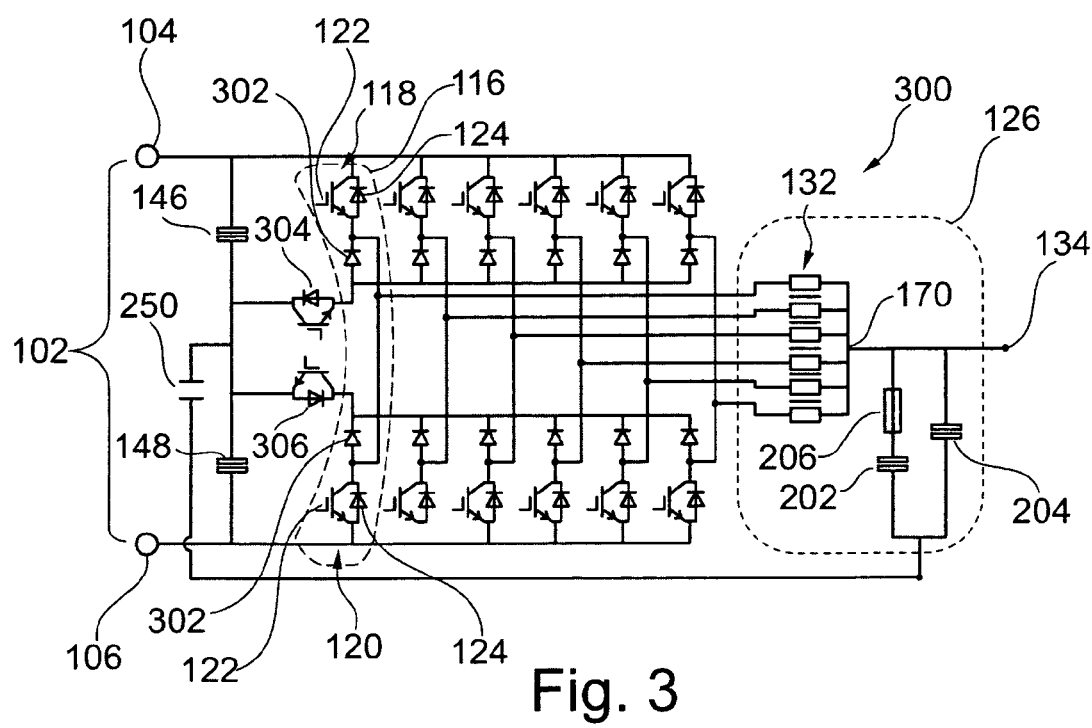
FIG. 3 illustrates a three-level inverter with six-fold interleaved parallel branches for each phase including a DC link capacitor and an output filter (only one phase is shown) according to an exemplary embodiment of the invention.

FIG. 3 illustrates an electronic inverter circuit 300 according to another exemplary embodiment which, in addition to the electronic inverter circuit 200 of FIG. 2, has an additional diode 302 in each block 118, 120 of each half-bridge 116. Additionally, two common blocks 304, 306 are provided which have a similar constitution as the blocks 118, 120 in FIG. 2. Hence, the electronic inverter circuit 300 comprises a first group 304 of a transistor and a diode and a second group 306 of a transistor and a diode. The first group 304 is connected between the direct current interface 102 and one of the two blocks 118 of each of the half-bridges 116. The second group 306 is connected between the direct current interface 102 and the other one of the two blocks 120 of each of the half-bridges 116.

The inverter concept based on parallel legs for each phase can be applied for two-level inverters (FIG. 2) as well as for multi-level-inverters like illustrated in FIG. 3 for a three-level inverter as an example. In order to minimize input and output ripple currents the multiple (n) inverter-legs connected in parallel are operated or pulsed with a phase shift of $2\pi/n$ to one another whereby the phase shift of $2\pi/n$ is dynamically adapted to the actual number of operative (or operated) half-bridges 116 for the case that the number of operated half-bridges 116 is reduced in order to improve partial load efficiency or because of a failure in an individual leg.

In order to further reduce ripple currents especially in the DC link capacitor, the groups of parallel legs of each of the three phases which may be denoted as L1, L2, L3 (or U, V, W respectively) are operated or pulsed with a phase shift of $2\pi/(3n)$ to one another.

As in FIG. 2, a further optional smoothing capacitor 250 may be arranged in a bypass path connecting a common connection of smoothing capacitors 146, 148 with a common connection of filter capacitors 202, 204. 17.

However, smoothing capacitor 250 may also be omitted. In this case, the bypass path connects smoothing capacitors 146, 148 by a direct ohmic connection to filter capacitors 202, 204.

In both embodiments of FIG. 2 and FIG. 3 the switching operations result in permanently occurring potential-shifts between the DC-link and the three-phase AC circuit, when these are not additionally interconnected. These potential shifts are the source for common-mode noise (Electromagnetic Interference) and can cause severe problems e.g. in photovoltaic applications, where high frequent currents are caused by the high frequent common-mode voltages in combination with the unavoidable parasitic ground-capacitances of an extensive solar plant. In order to build a short-circuit path for these high frequent harmonic currents the electrical potential of the DC-link is coupled via further smoothing capacitor 250 with the star-point of the filter-capacitors 202, 204. In combination with the common-mode inductance of the filter chokes, this further smoothing capacitor 250 builds a low-pass filter for common-mode currents between DC-link and AC-side. The size of this coupling capacitance is chosen in a way that high harmonics can be filtered out.

Figure 4:
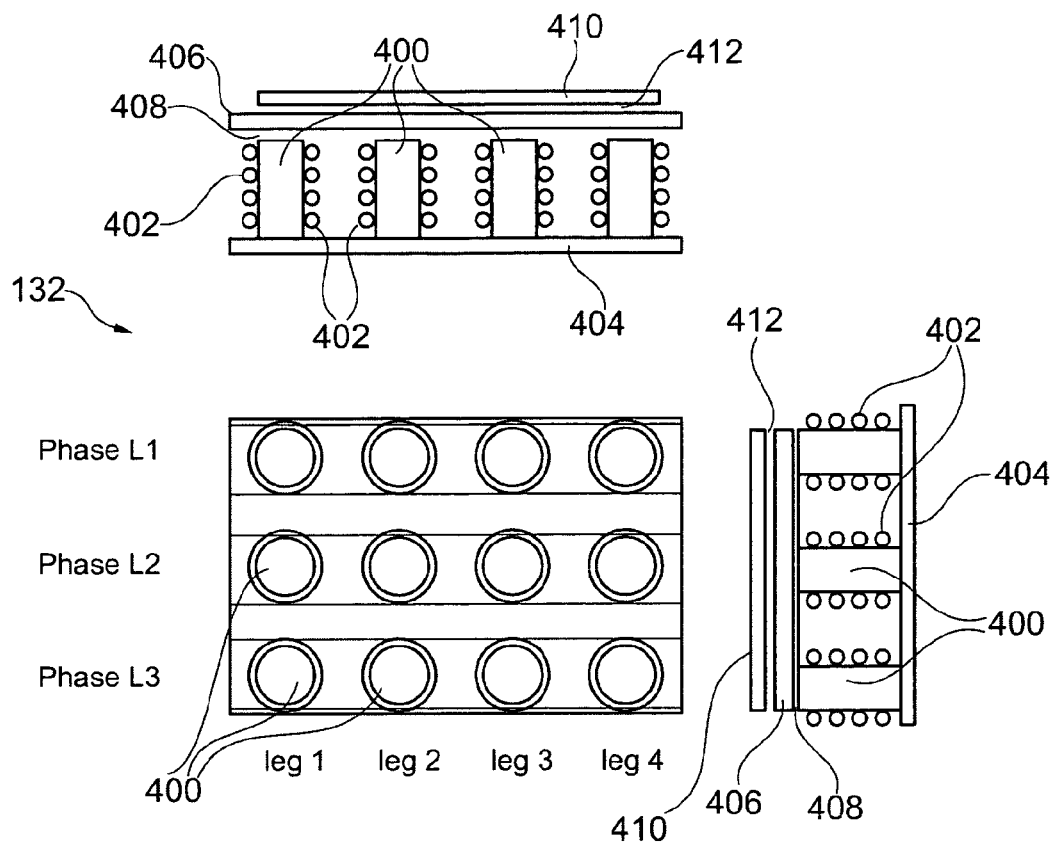
FIG. 4 illustrates a possible mechanical assembly of a coupled inductance for the output filter of a three-phase inverter with four interleaved parallel branches in each phase according to an exemplary embodiment of the invention.

FIG. 4 shows a detailed view of an embodiment of the coupled inductor 132 such as the one implemented in the electronic inverter circuits 200, 300 of FIG. 2 and FIG. 3.

The coupled inductor 132 comprises a plurality of ferromagnetic cylinders 400 which are arranged laterally spaced relative to one another and which are arranged in a matrix-like pattern. Furthermore, a plurality of coils 402 are provided, wherein each coil 402 is wound over an assigned one of the plurality of ferromagnetic cylinders 400. A first ferromagnetic coupling plate 404 is directly connected to each of the plurality of ferromagnetic cylinders 402. Moreover, a second ferromagnetic coupling plate 406 is arranged slightly spaced from each of the plurality of ferromagnetic cylinders 400 via a small air gap 408. An extension direction of the ferromagnetic cylinders 400 is perpendicularly to the planes defined by the metal plates 404, 406. Additionally, a third ferromagnetic plate 410 is arranged to be spaced from the second ferromagnetic plate 406 by a further air gap 412. As can be taken schematically from FIG. 4, the air gaps 408, 412 represent components of the impedance of the coupled inductor 132. One terminal of each of the coils 402 is connected, as can be taken from a comparison with FIG. 2 and FIG. 3, to a connection between the two blocks 118, 120 of a respective half-bridge 116. As can further be taken from FIG. 2, the other terminal of each coil 402 is electrically coupled to the connection point 170 at which all current contributions at the respective outputs of the coupled inductor 132 are added.

As can be taken from the equivalent circuit 132' (shown in FIG. 5) of the coupled inductor 132, the various design parameters for adjusting the impedance properties of the coupled inductor 132 are the geometries of the magnetic cylinders 400 as well as the width of the air gaps 408, 412 which have a direct impact on different contributions of the impedance.

By an embodiment of the filter chokes as magnetically coupled inductors, the fundamental harmonic current will be compensated to a large extent. This allows an essential reduction of iron/ferrite core material. In these coupled inductors the common-mode inductance values are substantially lower than the differential-mode values. As the phase shifted ripple-currents created by the interleaved legs primarily represent differential-mode signals they will be suppressed effectively, whereas the balanced currents of the fundamental harmonic only represent common-mode signals, for which the coupled inductors show relatively low inductance values.

Figure 5:
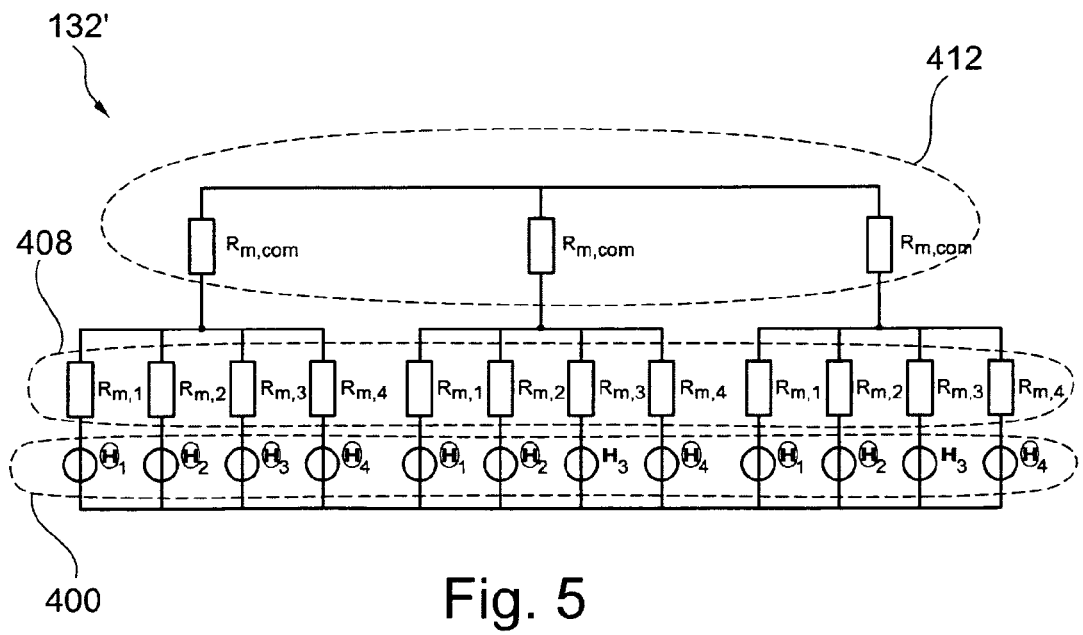
FIG. 5 illustrates an equivalent circuit of the coupled inductance of FIG. 4.

Coupled inductors can be realized in different ways. The solution of FIG. 4 and FIG. 5 is that a non-coupled inductor is connected in series with a fully coupled inductor, the first one representing the common-mode component of the inductance, the second one representing the differential-mode part. In order to minimize the size, it is advantageous to combine both the differential-mode and common-mode inductance and integrate all three phases in one magnetic device.

A preferred assembly and the corresponding equivalent circuit of such a device is shown in FIG. 4 using the example of four parallel interleaved legs in each phase.

In such a system of magnetically coupled inductors, the coupling factor can be adjusted by the relation between the magnetic resistance $R_{m,com}$ and the values of $R_{m,x}$, the magnetic resistances in turn are defined by length and width of the air gaps 408, 412. Good results can be achieved when $R_{m,com}$ is about ⅔ of $R_{m,x}$.

As in a three-phase system the vectorial sum of the three currents is zero, the sum of the residual fluxes through the return legs will be zero as well. This means that—like in any three-phase choke—the return legs can be principally omitted, or at least reduced in its cross-sectional area. If, however, the arrangement includes a back-iron it can be shared by the three phases.

The combination of multiple (phase shifted) parallel legs with magnetically coupled inductors allows to shift the filter resonance towards higher frequency values (for example towards 10 kHz in case of 20 kHz switching frequency and six parallel half bridges) resulting in very small filter elements with negligible dissipative losses in the damping resistors. Such a combination of inverter and output filter provides pure sinusoidal output voltages and can therefore be applied both for grid-side (50 Hz/60 Hz) applications as well as for motor applications with fundamental harmonic frequencies from DC up to typically 500 Hz and even more if the filter losses, which are proportionally increasing with the fundamental frequency are still acceptable.

This inverter/filter combination is therefore best suited for an all-in-one inverter in electric vehicles or plug-in hybrids as it can be operated as a grid-side inverter (three-phase or single-phase) for charging and as a motor-inverter for driving, with the great additional advantage of providing pure sinusoidal voltage waveforms completely avoiding motor losses due to harmonics. The compact inverter-filter combination also comprises EMI-filter components and is therefore entirely eliminating conducted noise on input and output cables.

Figure 6:
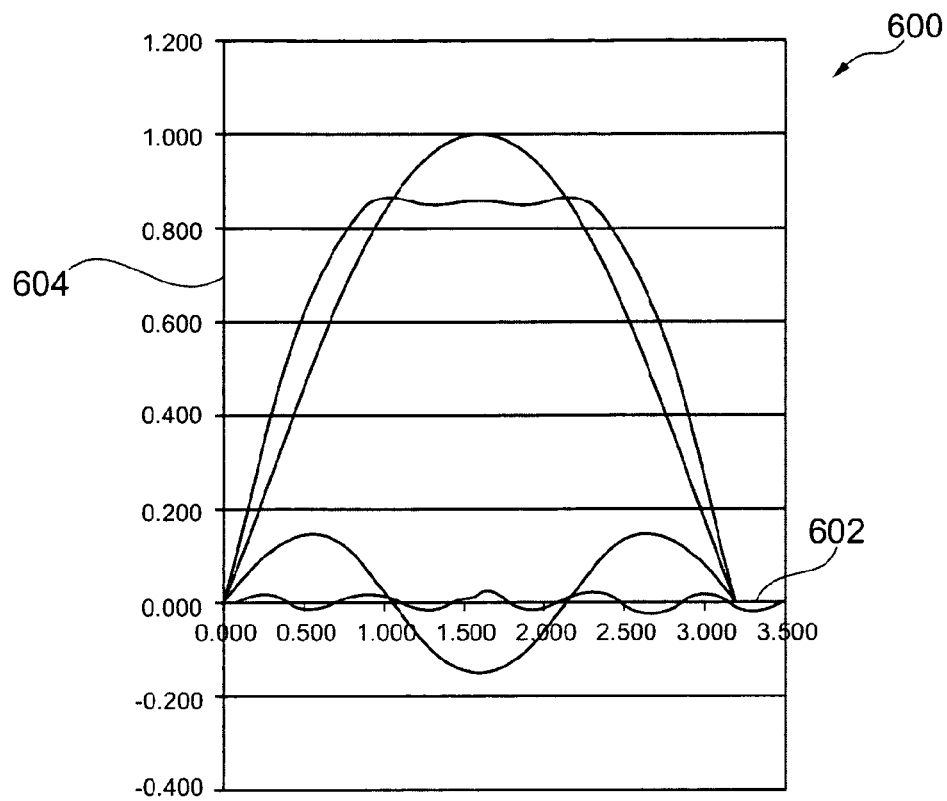
FIG. 6 shows a diagram which illustrates a superposition of a third and a ninth harmonic to the phase voltage in order to flatten a phase-voltage curve according to an exemplary embodiment of the invention.

A diagram 600 shown in FIG. 6 comprises an abscissa 602 along which a phase value is plotted. Along an ordinate 604, a voltage is plotted.

A method to increase the maximum amplitude of the AC output-voltage in a three-phase inverter at a limited DC input voltage is the superposition of a third harmonic (+9th harmonic) to the PWM (pulse width modulation) reference voltage. This will increase the output voltage by about 15%. For a grid-side inverter this method can be applied to lower the minimum DC voltage at a given three-phase AC voltage (compare FIG. 6). In an embodiment of the invention, this method may be applied to flatten the phase-voltage curve resulting in a nearly constant duty cycle during half of the whole 50 Hz cycle.

Figure 7:
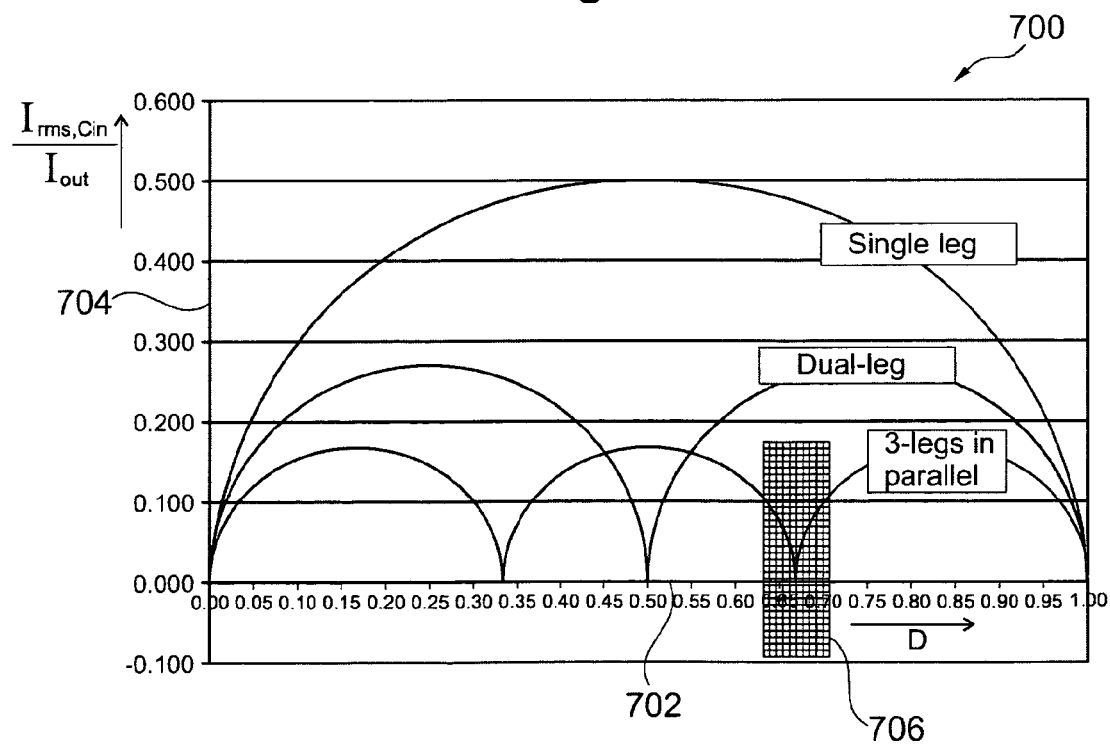
FIG. 7 illustrates a DC link capacitor ripple current characteristics as a function of the duty cycle, wherein the ripple current can be minimized by keeping the duty cycle for example in the range around 0.67 over a long part of the period.

FIG. 7 shows a diagram 700 having an abscissa 702 along which a duty cycle is plotted. Along an ordinate 704, a measure for the ripple current is plotted. As can be taken from FIG. 7, particularly in a region 706 around 0.67 of the duty cycle 702, a very small ripple current can be obtained. Thus, it may be advantageous that the electronic circuit is adjusted to operate in a corresponding operation state.

When the multiple parallel connected half-bridges are operated phase shifted to each other, then the residual ripple current in the DC link capacitor and in the capacitors of the output filter is dependent on the duty cycle in the way as shown in FIG. 7. As the duty cycle is defined by the relation between DC link voltage and the magnitude of the sinusoidal output voltage, this relation will be adjusted in a way that the ripple current in the output and input capacitance is minimized.

In case of for example a grid-side photovoltaic inverter (at 400V, 3~) with three parallel phase shifted half-bridges it is possible to select the number of solar panels in the string in a way that the voltage becomes ~840V at nominal temperature and load conditions. This corresponds with a duty cycle of ⅔ over the wide range of the flattened sinusoidal phase voltage resulting in minimized capacitor ripple currents and thus highest efficiency.

The ripple currents in the input capacitance as well as in the output capacitance can be further reduced by dynamically superimposing a third harmonic waveform signal to the sinusoidal reference signal in the PWM generator of the control unit by adapting the amplitude of this third harmonic waveform in accordance with the actual relation between DC link voltage and the magnitude of the sinusoidal output voltage.

Figure 8A:
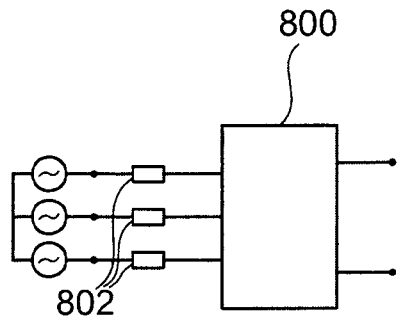
FIG. 8A illustrates a multi-purpose inverter according to an exemplary embodiment of the invention as a three-phase utility interface with a grid-coupling via a line choke.

FIG. 8A illustrates a multi-purpose inverter 800 as a three-phase utility interface according to an embodiment of the invention. The multi-purpose inverter 800 can be configured for instance as shown in FIG. 1 or based on FIG. 2 or FIG. 3. Grid-coupling is achieved according to FIG. 8A via a line choke 802. The multi-purpose inverter 800 shown in FIG. 8A includes a DC link capacitor and an output filter, as described above.

Figure 8B:
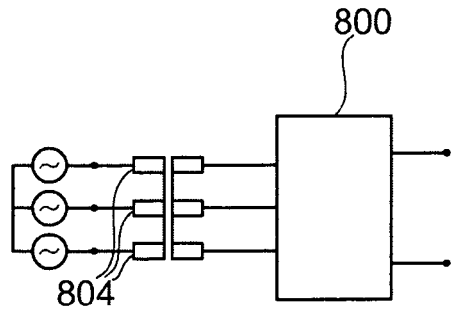
FIG. 8B illustrates a multi-purpose inverter according to an exemplary embodiment of the invention as a three-phase utility interface with an isolated grid-coupling via a transformer.

FIG. 8B illustrates another electronic inverter circuitry in which, as compared to FIG. 8A, the line choke 802 substituted by a transformer 804.

This type of three-phase inverter with integrated output filter can be applied for manifold purposes.

In combination with a three-phase line choke 802 of a small inductance value (for example $v_{sc}$=2% . . . 4%) the inverter of FIG. 8A represents a utility interface for any three-phase AC to DC conversion either with unidirectional or bidirectional power flow. As shown in FIG. 8B, the line choke 802 can also be replaced by the transformer 804 (preferably with a small short circuit voltage of about 4%), thus providing a high dynamic DC supply isolated from the grid.

A typical practical application of such a utility interface is a battery or ultra-cap simulator, for which for example the transformer coupled multi-purpose inverter can be combined with a (non-isolated) DC-DC converter connected in series with the inverter, thus being capable of providing the whole DC voltage span from zero to for example 900V.

In any three-phase motor/generator drive application (with asynchronous or synchronous motors) this inverter supplies the electrical machine with pure sinusoidal output voltages and thus reduces losses and prevents the isolation from material stress by high dV/dt. The inverter is also properly suited for high speed drives, which typically have low stator leakage inductance values resulting in very high ripple currents when supplied by conventional PWM inverters.

In the following, referring to FIG. 9, a drive system 900 for an electric vehicle according to another exemplary embodiment of the invention will be described.

The drive system 900 comprises a battery 902. The battery 902 may be a battery package, for instance with integrated stacked DC/DC converters. Additionally, an electronic circuit having the above-mentioned features is provided in the form of the multi-purpose inverter 800. The direct current supply interface of the multi-purpose inverter 800 is coupled to the battery 902. For instance, the multi-purpose inverter 800 may be configured by combining three circuitries as shown in FIG. 2.

The drive system 900 furthermore comprises an electromotor 904 which is drivable by electric power from the battery 902. The output alternating current supply surface of the electronic circuit 800 is coupled to the electromotor 904. A drive shaft of the driven vehicle is indicated by reference numeral 906.

Additionally, a charging entity 908 is provided which is configured for charging the battery 902, if desired. The output alternating current supply interface of the electronic circuit 800 which is coupled to the electromotor 904 is also coupled to the charging entity 908. The charging entity 908 is configured for selectively charging the battery 902 with one phase or with three phases. A charging via three phases is accomplished via a single phase power supply to be connected via a plug 910. Alternatively, the battery 902 can be charged by a three-phase power supply connectable by a plug 912.

For selecting which of the plugs 910, 912 shall charge the battery 902, corresponding switches 914 need to be operated accordingly. In a similar manner, for operating the drive system 900 for driving the motor 904, switches 916 need to be operated accordingly.

In electric or plug-in hybrid vehicles this inverter can be utilized both as utility-interface when the vehicle is charging and as a motor inverter when the vehicle is running. FIG. 9 illustrates such a multipurpose application in an electrical vehicle and also illustrates the optional single-phase charging mode by operating the three-phase inverter as a single-phase full-bridge converter.

Figure 10:
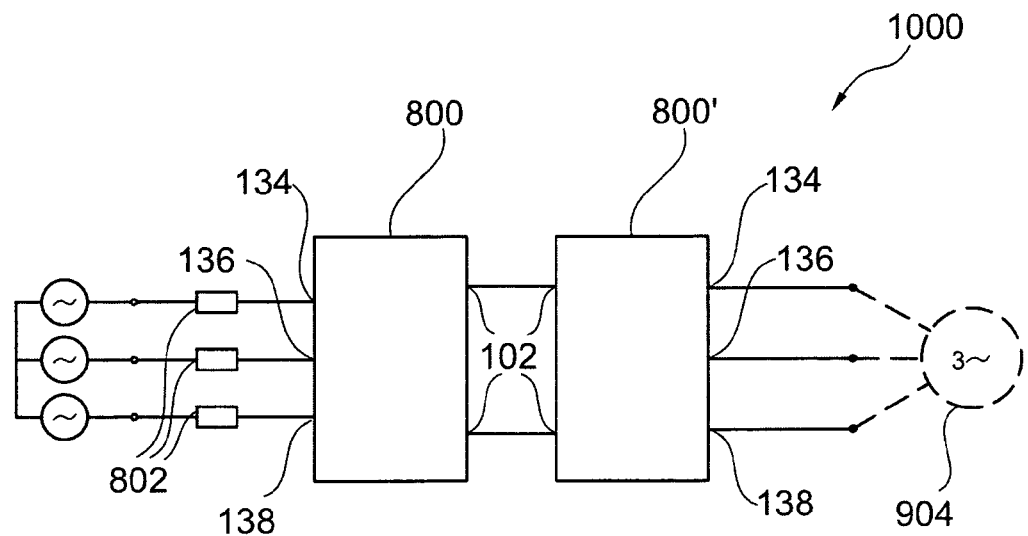
FIG. 10 illustrates a frequency converter for a 4-quadrant motor drive according to an exemplary embodiment of the invention.

FIG. 10 illustrates a frequency converter 1000 for a 4-quadrant motor drive according to an exemplary embodiment of the invention.

The frequency converter 1000 comprises a first electronic circuit 800 operating at a first frequency. A second electronic circuit 800' is provided which can be configured similar to the electronic circuit 800 but operates at a second frequency which differs from a first frequency. The direct current interface 102 of the first electronic circuit 800 is coupled to the direct current interface 102 of the second electronic circuit 800'. An alternating current is supplied to the alternating current interface 134, 136, 138 of the first electronic circuit 800. An alternating current is generated at the alternating current supply interface 134, 136, 138 of the second electronic circuit 800'. Hence, an input alternating signal supplied via the line choke 802 can be converted by the two electronic circuits 800, 800' serving as a frequency converter towards electromotor 904. This shows that the functioning of the electronic circuits 800, 800' can be performed in both directions, i.e. can be used for converting a direct current into an alternating current, or can also be operated to convert an alternating current into a direct current.

By coupling two inverters 800, 800' in series (back to back) it is possible to obtain a high dynamic frequency-converter with sinusoidal outputs which can be applied in a manifold way for example as frequency converter for a 4 quadrant motor drive in industry applications or for example in applications for combustion engine or electric motor testing as shown in FIG. 10.

Figure 11:
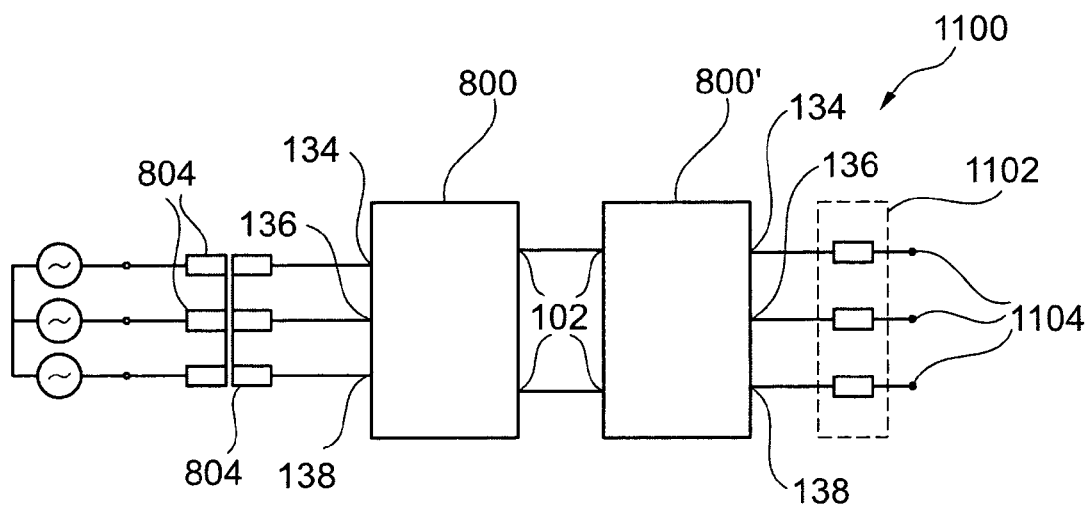
FIG. 11 illustrates a three-phase sinusoidal voltage generator for various applications according to an exemplary embodiment of the invention.

A frequency converter 1100 according to another exemplary embodiment of the invention shown in FIG. 11 comprises a transformer 804 connected between a source providing the supplied alternating current and the alternating current supply interface 134, 136, 138 of the first electronic circuit 800. Furthermore, an optional output inductance 1102 is provided.

Thus, a three-phase sinusoidal output voltage can be provided at an output terminal 1104. Hence, a high dynamic three-phase sinusoidal voltage generator is provided with galvanic isolation from the grid acting as source or load (bidirectional power flow), which in turn can be utilized for many applications such as an artificial mains network, or an E-motor simulator.

Figure 9:
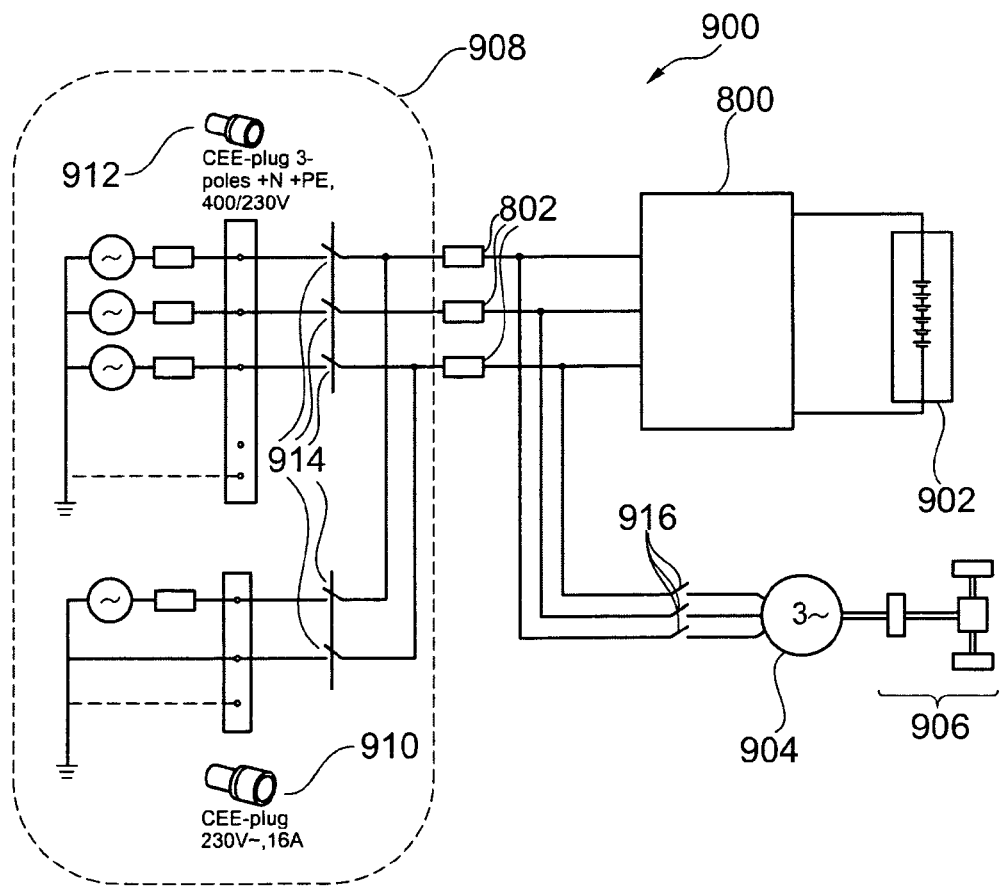
FIG. 9 illustrates a three-phase inverter according to an exemplary embodiment of the invention with sinusoidal output-voltage optionally operated as motor inverter or as utility interface for three-phase or single-phase charging.
Figure 12:
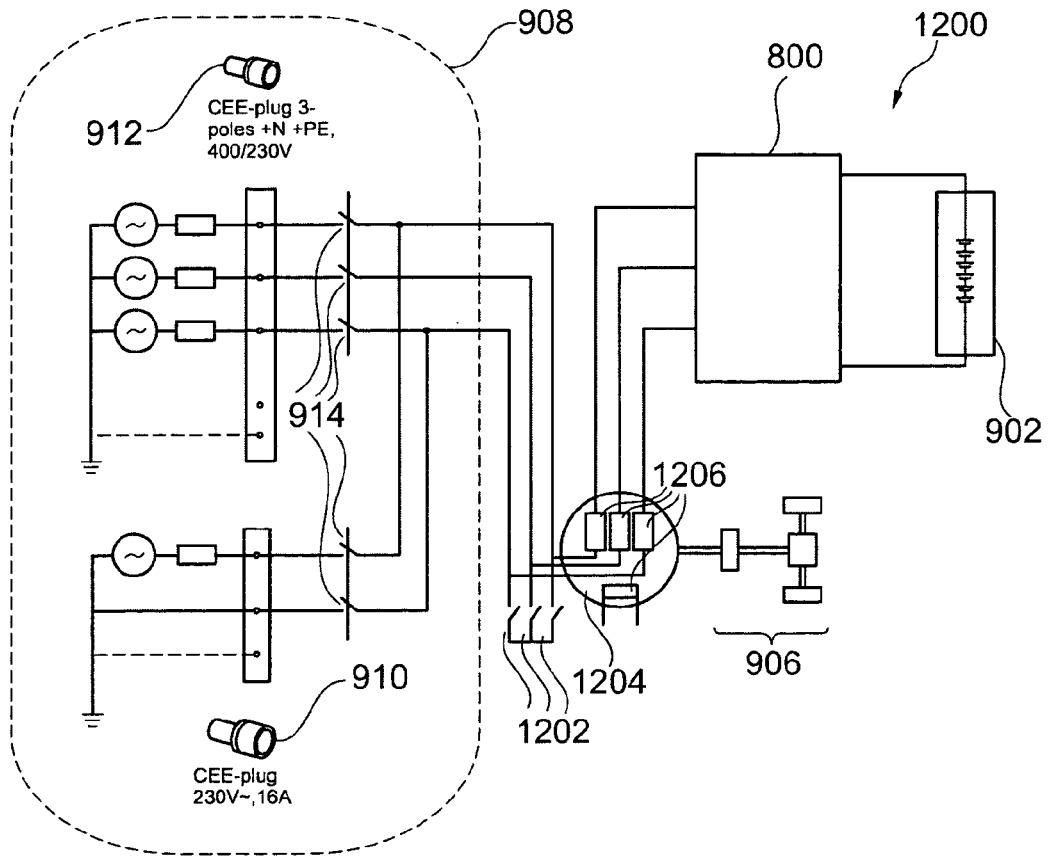
FIG. 12 illustrates a three-phase inverter according to an exemplary embodiment of the invention with sinusoidal output-voltage optionally operated as motor inverter or as utility interface for three-phase or single-phase charging.

FIG. 12 illustrates a three-phase inverter 1200 according to an exemplary embodiment of the invention and being configured similar as FIG. 9.

FIG. 12 illustrates the utilization of the motor windings of a three-phase motor instead of an additional mains choke. This method will be preferably applied in case of an externally excited synchronous motor or in case of an induction motor. In both cases the main flux in the motor will be near zero during the charging operation resulting in a negligible residual torque, produced by the 50 Hz/60 Hz sinusoidal current through the three motor phases. A mechanical break will be applied for preventing rotation during charging anyway. Switches are denoted with reference numeral 1202, whereas a block 1204 is formed of a plurality of resistors 1206.

Figure 13:
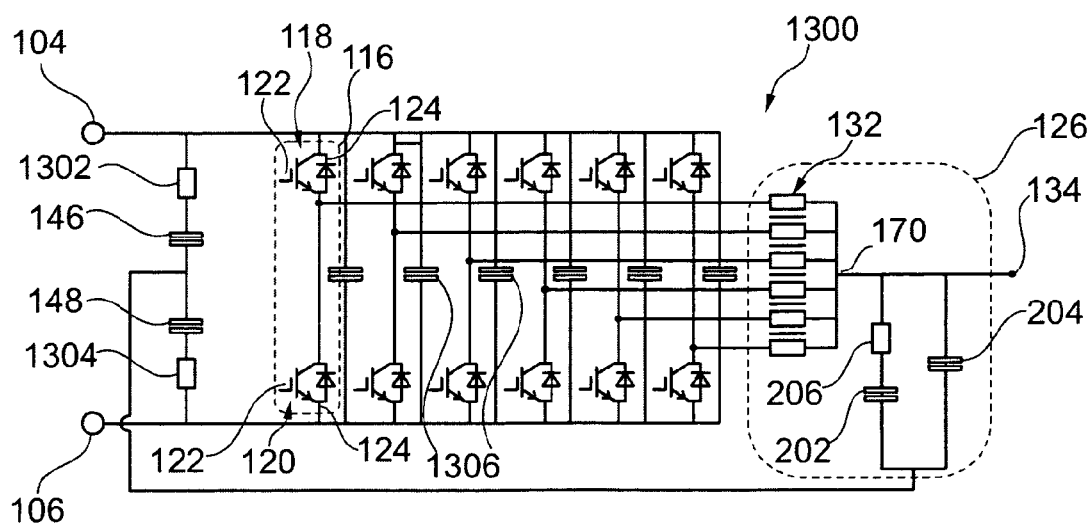
FIG. 13 illustrates a two-level inverter similar to FIG. 2 but additionally having damping resistors on an input side and having capacitive paths interposed between consecutive half bridges according to an exemplary embodiment of the invention.

FIG. 13 illustrates a two-level inverter 1300 similar to FIG. 2 but additionally having damping resistors 1302, 1304 on an input side according to an exemplary embodiment of the invention. Furthermore, a respective capacitance 1306 is connected in a respective path being connected in parallel between each pair of adjacent half-bridges 116. The damping resistances 1302, 1304 are arranged between the direct current interface 104, 106 and the set of switchable half-bridges 116 and are configured for damping artifacts superposed to the direct current signal. More specifically, two damping resistances 1302, 1304 are provided, wherein a first damping resistance 1302 is directly connected to one terminal or node 104 of the direct current interface and a second damping resistances 1304 is directly connected to the other terminal or node 106 of the direct current interface. The two smoothing capacitors 146, 148 are connected in series between the two damping resistances 1302, 1304.

Thus, a capacitor 1306 is placed close to every half-bridge 116 and the respective main DC-side capacitor 146, 148 will be damped by series resistors 1302, 1304, which can optionally be NTC-resistors. Hence, the electronic circuit 1300 comprising a set of capacitive paths each comprising a capacitor 1306, wherein each capacitive path of the set is connected in parallel between a respective pair of adjacent ones of the set 116 of switchable half-bridges 118, 120.

In an embodiment of the electronic circuit the set of switchable half-bridges, the control unit and the filter entity are all formed on a common printed circuit board.

In an embodiment of the electronic circuit the direct current interface is configured for supplying a direct current; wherein the set of switchable half-bridges is coupled to the direct current interface for supplying the direct current to the half-bridges.

In an embodiment of the electronic circuit the control entity is configured for switching the half-bridges to thereby divide the current equally into the plurality of parallel current paths relating to the plurality of half-bridges, particularly based on measuring the current of each path or by measuring the sum of the current of low-side switches or high side switches and analyzing this signal by autocorrelation functions.

In an embodiment of the electronic circuit the alternating current interface is configured for supplying an alternating current; wherein the set of switchable half-bridges is coupled to the alternating current for supplying the alternating current to the half-bridges.

In an embodiment of the electronic circuit the control entity is configured for controlling the set of switchable half-bridges and the at least one further set of switchable half-bridges to provide at least two phase shifted output alternating current signals at the alternating current to the half-bridges.

In an embodiment of the electronic circuit the at least a part of the switches comprises a transistor, particularly one of the group consisting of a bipolar transistor or a field effect transistor.

In an embodiment of the electronic circuit two damping resistances are provided, one of which being directly connected to one terminal of the direct current interface and the other one being directly connected to the other terminal of the direct current interface, and wherein two smoothing capacitors are provided and connected in series between the two damping resistances.

In an embodiment of the electronic circuit comprises a set of capacitive paths each comprising a capacitor, wherein each capacitive path of the set is connected in parallel between a respective pair of adjacent ones of the set of switchable half-bridges.

In an embodiment of the electronic circuit the predefined relative phase shift between pulses of different half-bridges is $2\pi/n$, wherein the angle $2\pi$ corresponds with one period of the switching frequency and wherein n is the number of half-bridges of the set.

In an embodiment of the electronic circuit the relative phase shift of the pulses between different sets is $2\pi/(n \times m)$, wherein the angle $2\pi$ corresponds with one period of the switching frequency and wherein n is the number of half-bridges in one set and m is the number of sets, wherein n and m are both integer numbers larger than or equal to one.

In an embodiment of the electronic circuit the coupled inductor is configured such that one terminal of each coil is connected to a respective one of the half-bridges and another terminal is connected to the alternating current interface.

In an embodiment the electronic circuit is configured as a battery simulator.

In an embodiment the electronic circuit is configured as an active harmonic mains filter.

In an embodiment the electronic circuit comprises a transformer connected between a source providing an alternating current and the alternating current interface.

In an embodiment the electronic circuit is configured as at least one of the group consisting of a signal generator, a grid simulator or a simulator for electric motors.

According to an embodiment, an arrangement of three sets of electronic circuits is provided, wherein ripple currents in an input capacitance between the direct current interface and the set of switchable half-bridges as well as in an output capacitance of the filter entity are reduced by superimposing a third harmonic waveform signal to a sinusoidal reference signal in a pulse width modulator generator of the control unit resulting in a period of constant duty cycle of the pulse width modulation, allowing to adjust a direct current link voltage and thus the duty cycle in a way that at least partially cancels phase-shifted harmonics.

According to an embodiment of the arrangement the ripple currents in the input capacitance as well as in the output capacitance are reduced by dynamically superimposing the third harmonic waveform signal to the sinusoidal reference signal in the pulse width modulator generator of the control unit by adopting the amplitude of this third harmonic waveform in accordance with the actual relation between direct current link voltage and the magnitude of a sinusoidal output voltage.

According to an embodiment of the arrangement the inherently created common-mode signals between the direct current interface and the alternating current interface are suppressed by connecting the common star point of the filter entity of multiple sets of switchable half-bridges with a voltage mid-point of the direct current interface creating a low-pass common-mode filter for suppressing harmonics in an electromagnetic interference range but letting pass a potential shift of an optionally superimposed third harmonic.

According to an embodiment, the drive system comprises an electric motor being drivable by electric power from the battery, wherein the alternating current interface of the electronic circuit is coupled or couplable to the electric motor.

According to an embodiment of the drive system, the electronic circuit is configured for charging the battery or supplying power to a grid from the battery, wherein the alternating current interface of the electronic circuit is coupled or couplable to one or more phases of the grid via a mains-choke.

According to an embodiment of the drive system, the alternating current interface of the electronic circuit is coupled or couplable to one or more phases of a grid via stator inductances of a mechanically locked motor, thus avoiding the need of an additional mains-choke.

According to an embodiment of the drive system, the alternating current interface of the electronic circuit is coupled or couplable to a three phase grid via the stator inductances of a mechanically locked three-phase motor with at least two pole pairs, wherein the stator inductances are interconnected in a way that the three-phase currents flowing through the inductances do not create a rotating magnetic field in the motor.

According to an embodiment the drive system, a charging entity is configured for selectively charging the battery with one of at least two different numbers of phases, particularly of a mains supply.

According to an embodiment a coupled inductor is provided. The coupled inductor comprises a plurality of magnetic structures being arranged spaced relative to one another; a plurality of coils each of which being wound over an assigned one of the plurality of magnetic structures; a first magnetic coupling structure connected to each of the plurality of magnetic structures; and a second magnetic coupling structure being spaced from each of the plurality of magnetic structures via a gap.

According to an embodiment of the coupled inductor the plurality of magnetic structures is arranged in a two-dimensional array, particularly in a matrix-like array.

According to an embodiment of the coupled inductor the first magnetic coupling structure is a magnetic plate from which the magnetic structures protrude perpendicularly.

According to an embodiment of the coupled inductor the second magnetic coupling structure is a magnetic plate opposing the magnetic structures via the gaps.

According to an embodiment, the coupled inductor comprises a third magnetic coupling structure, particularly a magnetic plate, being spaced from the second magnetic coupling structure via a gap.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:
1. An electronic circuit, comprising:
a direct current interface at which a direct current is providable;
an alternating current interface at which an alternating current is providable;
a set of switchable half-bridges coupled to the direct current interface, each half-bridge comprising two blocks each having a switch and a diode;
a control entity configured for switching the switches of the half-bridges with a predefined relative phase shift between different half-bridges;
a filter entity arranged between the alternating current interface and a plurality of parallel paths relating to the plurality of half-bridges, wherein the filter entity comprises a coupled inductor inductively coupling the plurality of parallel paths,
wherein the control entity is configured so that, intermittently, both switches of each half-bridge are off and, at all other times, one of the switches of each half-bridge is on and the other one of the switches of the corresponding half-bridge is off.

2. The electronic circuit according to claim 1, wherein the control entity is configured so that, at any time, one of the switches of each half-bridge is on and the other one of the switches of the corresponding half-bridge is off.

3. The electronic circuit according to claim 1, comprising a first group of a switch and a diode and a second group of a switch and a diode, wherein the first group is connected between the direct current interface and one of the two blocks of each of the half-bridges, and wherein the second group is connected between the direct current interface and the other one of the two blocks of each of the half-bridges.

4. The electronic circuit according to claim 1, wherein the filter entity is configured for extracting a fundamental harmonic from each of the plurality of parallel paths and for superposing the extracted fundamental modes to thereby generate an output alternating current to be applied to the alternating current interface.

5. The electronic circuit according to claim 4, wherein the filter entity further comprises at least one filter capacitor and/or at least one damping resistor configured for frequency filtering, particularly for low pass filtering or band pass filtering, of the output alternating current.

6. The electronic circuit according to claim 1,
comprising at least one further set of switchable half-bridges coupled to the direct current interface, each further half-bridge comprising two blocks each having a switch and a diode;
wherein the control entity is configured for controlling the set of switchable half-bridges and the at least one further set of switchable half-bridges so that the set and the at least one further set are operated with a predefined relative phase shift between different sets in terms of their fundamental harmonic.

7. The electronic circuit according to claim 1, comprising at least one smoothing capacitor arranged between the direct current interface and the set of switchable half-bridges and configured for smoothing the direct current.

8. The electronic circuit according to claim 7, wherein two smoothing capacitors are provided and connected in series between two terminals of the direct current interface, wherein the electronic circuit further comprises a feedback loop connecting the filter entity to a connection between the two smoothing capacitors.

9. The electronic circuit according to claim 8, wherein the feedback loop consists of an ohmically conductive path, or comprises or consists of a feedback capacitor in an electrically conductive path.

10. The electronic circuit according to claim 1, comprising at least one damping resistance arranged between the direct current interface and the set of switchable half-bridges and being configured for damping signal artifacts superposed to the direct current.

11. The electronic circuit according to claim 1, wherein the control unit is configured for dynamically adapting a phase shift of $2\pi/n$ to an actual number of operative or operated half-bridges for the case that the number of operated half-bridges is reduced, particularly in order to improve partial load efficiency or because of failures in individual half-bridges.

12. The electronic circuit according to claim 1, wherein the control entity is configured for operating different sets of half-bridge groups by interconnecting them and synchronizing the phase-shift via a high speed communication.

13. A drive system for an electric- or a hybrid vehicle, the drive system comprising
a battery configured for providing a direct current; and
an electronic circuit including:
  a direct current interface at which a direct current is providable;
  an alternating current interface at which an alternating current is providable;
  a set of switchable half-bridges coupled to the direct current interface, each half-bridge comprising two blocks each having a switch and a diode;
  a control entity configured for switching the switches of the half-bridges with a predefined relative phase shift between different half-bridges; and
  a filter entity arranged between the alternating current interface and a plurality of parallel paths relating to the plurality of half-bridges, wherein the filter entity comprises a coupled inductor inductively coupling the plurality of parallel paths,
  wherein the direct current interface is coupled to the battery,
  wherein the control entity is configured so that, intermittently, both switches of each half-bridge are off and, at all other times, one of the switches of each half-bridge is on and the other one of the switches of the corresponding half-bridge is off.

14. A frequency converter, the frequency converter comprising:
a first electronic circuit including:
  a direct current interface at which a direct current is providable;
  an alternating current interface at which an alternating current is providable;
  a set of switchable half-bridges coupled to the direct current interface, each half-bridge comprising two blocks each having a switch and a diode;
  a control entity configured for switching the switches of the half-bridges with a predefined relative phase shift between different half-bridges; and
  a filter entity arranged between the alternating current interface and a plurality of parallel paths relating to the plurality of half-bridges, wherein the filter entity comprises a coupled inductor inductively coupling the plurality of parallel paths, the first electronic circuit operating at a first frequency;
a second electronic circuit arranged as the first electronic circuit operating at a second frequency;
wherein the direct current interface of the first electronic circuit is coupled to the direct current interface of the second electronic circuit;
wherein an alternating current is supplyable or supplied to the alternating current interface of the first electronic circuit at the first frequency; and
wherein an alternating current is generated at the alternating current interface of the second electronic circuit at the second frequency;
wherein the control entity is configured so that, intermittently, both switches of each half-bridge are off and, at all other times, one of the switches of each half-bridge is on and the other one of the switches of the corresponding half-bridge is off.

15. The frequency converter according to claim 14, further comprising:
a transformer connected between a source providing an alternating current and the alternating current interface of the first electronic circuit.

16. The frequency converter according to claim 15, configured as at least one of the group consisting of a signal-generator, a grid simulator or and a simulator for electric motors.

17. A method of generating an output alternating current from a supplied direct current, the method comprising:
supplying the direct current to a set of switchable half-bridges, each half-bridge comprising two blocks each having a switch and a diode;
switching the switches of the half-bridges with a predefined relative phase shift between different half-bridges for dividing the direct current into a plurality of parallel paths relating to the plurality of half-bridges;

extracting a fundamental mode from each of the plurality of parallel paths in a filter entity;

superposing the extracted fundamental modes in the filter entity to thereby generate the output alternating current;

wherein the filter entity comprises a coupled inductor inductively coupling the plurality of parallel paths;

wherein the method is configured so that, intermittently, both switches of each half-bridge are off and, at all other times, one of the switches of each half-bridge is on and the other one of the switches of the corresponding half-bridge is off.

18. A computer-readable medium, in which a computer program of generating an output alternating current from a supplied direct current is stored, which computer program, when being executed by a processor, is adapted to carry out or control the steps of:

supplying the direct current to a set of switchable half-bridges, each half-bridge comprising two blocks each having a switch and a diode;

switching the switches of the half-bridges with a predefined relative phase shift between different half-bridges for dividing the direct current into a plurality of parallel paths relating to the plurality of half-bridges;

extracting a fundamental mode from each of the plurality of parallel paths in a filter entity; and superposing the extracted fundamental modes in the filter entity to thereby generate the output alternating current;

wherein the filter entity comprises a coupled inductor inductively coupling the plurality of parallel paths;

wherein the steps include so that, intermittently, both switches of each half-bridge are off and, at all other times, one of the switches of each half-bridge is on and the other one of the switches of the corresponding half-bridge is off.

19. A program element of generating an output alternating current from a supplied direct current, which program element, when being executed by a processor, is adapted to carry out or control the steps of:

supplying the direct current to a set of switchable half-bridges, each half-bridge comprising two blocks each having a switch and a diode;

switching the switches of the half-bridges with a predefined relative phase shift between different half-bridges for dividing the direct current into a plurality of parallel paths relating to the plurality of half-bridges;

extracting a fundamental mode from each of the plurality of parallel paths in a filter entity; and superposing the extracted fundamental modes in the filter entity to thereby generate the output alternating current;

wherein the filter entity comprises a coupled inductor inductively coupling the plurality of parallel paths;

wherein the steps include so that, intermittently, both switches of each half-bridge are off and, at all other times, one of the switches of each half-bridge is on and the other one of the switches of the corresponding half-bridge is off.

\* \* \* \* \*